(12) United States Patent
Linder et al.

(10) Patent No.: US 7,769,615 B2
(45) Date of Patent: Aug. 3, 2010

(54) CONSTRAINTS-BASED ANALYSIS AND STRATEGY PLANNING METHODS AND TOOLS

(75) Inventors: Jane C. Linder, Charlestown, MA (US); Paul F. Nunes, Canton, MA (US); Anita M. Thompson, Highland Park, IL (US); Margaret M. Van Winkle, Greenwich, CT (US)

(73) Assignee: Accenture Global Services GmbH, Schaffhausen (CH)

( * ) Notice: Subject to any disclaimer, the term of this patent is extended or adjusted under 35 U.S.C. 154(b) by 729 days.

(21) Appl. No.: 11/709,878

(22) Filed: Feb. 23, 2007

(65) Prior Publication Data

US 2008/0208648 A1    Aug. 28, 2008

(51) Int. Cl.
*G06F 9/44* (2006.01)
(52) U.S. Cl. .......................................... 705/7
(58) Field of Classification Search ................... 705/7
See application file for complete search history.

(56) References Cited

U.S. PATENT DOCUMENTS

2001/0041995 A1* 11/2001 Eder ............................. 705/7
2005/0144106 A1* 6/2005 Eder ............................. 705/36
2005/0251468 A1* 11/2005 Eder ............................. 705/35
2007/0156478 A1* 7/2007 Breene et al. ................. 705/7

OTHER PUBLICATIONS

Eisley N, et al.; The Middle Path: Dealing with Transformation in Asia's Information Technology Competitiveness Experience; Elsevier Science Ltd; International Journal of Information Management, vol. 16, No. 4; pp. 253-276.*

* cited by examiner

*Primary Examiner*—Susanna M Diaz
*Assistant Examiner*—Ashley Y Chou
(74) *Attorney, Agent, or Firm*—Finnegan, Henderson, Farabow, Garrett & Dunner LLP

(57) ABSTRACT

Disclosed herein are methods and related tools for assisting users in analyzing and identifying various constraints that limit the impact of business growth strategies, and for helping those users identify, research, and/or implement strategies in light of identified constraints. More particularly, disclosed are information management methods and electronic computing tools for enabling managers to utilize accumulated information to identify and address constraints that otherwise limit innovation and growth of their business ventures.

17 Claims, 6 Drawing Sheets

| Constraint (101) / Philosophy (107) | Organizational Focus (108) ||| Value Chain Focus (109) ||||
|---|---|---|---|---|---|---|---|
| | Top Management Led | Distributed | Internally Networked | Supplier Driven | Partner Intensive | Competitor Driven | Customer Driven |
| Ideation (102) | | | | | | | |
| We have too few ideas | | ✓ | ✓ | ✓ | ✓ | | ✓ |
| Our ideas have too little potential value | ✓ | | ✓ | | | | ✓ |
| Our ideas are for things customers don't want or need | | ✓ | ✓ | ✓ (110) | | ✓ | ✓ |
| Selection (103) | | | | | | | |
| We are not able to select the best ideas to pursue | ✓ | | | | | | ✓ |
| We get the timing wrong - we are either too early or too late | | | | | | | ✓ |
| Too many initiatives pass our screen | ✓ (110) | | | | | ✓ | |
| Too few initiatives get through our screen | | ✓ | | | ✓ | ✓ | |
| Development (104) | | | | | | | |
| We can't afford to fully develop our ideas | | | | ✓ | ✓ | | ✓ |
| We quit too soon - we lack the will to complete tough projects | ✓ | ✓ | ✓ | | | | ✓ |
| We don't have enough capability (talent and processes) to develop our ideas | | | ✓ | ✓ | ✓ | | |
| We have good ideas, but competitors beat us to market | | | | ✓ | ✓ | | |
| Commercialization (105) | | | | | | | |
| Customer adoption rates are poor | ✓ | | | ✓ | | ✓ | ✓ |
| Our organizational design inhibits effective execution | ✓ | | ✓ | | | ✓ | ✓ |
| We lack credibility in target marketplaces | ✓ | | | | ✓ | | ✓ |
| Cycle-wide (106) | | | | | | | |
| The nature of innovation is changing in our industry - we are not well positioned | ✓ | ✓ | | | ✓ | | ✓ |
| The maturity of our existing markets limits our growth | ✓ | | | | ✓ | | ✓ |
| Our idea-to-profit cycle is too low | ✓ | ✓ | ✓ | ✓ | ✓ | ✓ | ✓ |

|  | | Philosophy | Organizational Focus | | | Value Chain Focus | | | |
|---|---|---|---|---|---|---|---|---|---|
| | Constraint | | Top Management Led | Distributed | Internally Networked | Supplier Driven | Partner Intensive | Competitor Driven | Customer Driven |
| Ideation | We have too few ideas | | | ✓ | ✓ | ✓ | ✓ | | ✓ |
| | Our ideas have too little potential value | | ✓ | | ✗ | | | | ✓ |
| | Our ideas are for things customers don't want or need | | | ✓ | ✓ | ✓ | | ✓ | ✓ |
| Selection | We are not able to select the best ideas to pursue | | ✓ | 501 | | | | | ✓ |
| | We get the timing wrong - we are either too early or too late | | | | | | | | ✓ |
| | Too many initiatives pass our screen | | ✓ | | | | | ✓ | |
| | Too few initiatives get through our screen | | ✗ ~502 | | | ✓ | ✓ | | |
| Development | We can't afford to fully develop our ideas | | | | | ✓ | ✓ | | ✓ |
| | We quit too soon - we lack the will to complete tough projects | | ✓ | ✓ | ✓ | | | | ✓ |
| | We don't have enough capability (talent and processes) to develop our ideas | | | | ✓ | ✗ | ✓ | | |
| | We have good ideas, but competitors beat us to market | | | | | ✓ | ✗ | | |
| Commercialization | Customer adoption rates are poor | | ✓ | | | ✓ | | ✓ | ✓ |
| | Our organizational design inhibits effective execution | | ✗ | | ✓ | | | ✓ | ✓ |
| | We lack credibility in target marketplaces | | ✓ | | | | ✓ | | ✗ |
| Cycle-wide | The nature of innovation is changing in our industry - we are not well positioned | | ✓ | ✓ | | | ✓ | | ✗ |
| | The maturity of our existing markets limits our growth | | ✓ | | | | ✓ | | ✓ |
| | Our idea-to-profit cycle is too low | | ✓ | ✓ | ✓ | ✓ | ✓ | ✗ | ✓ |

CONSTRAINTS-BASED ANALYSIS AND STRATEGY PLANNING METHODS AND TOOLS

FIELD OF THE INVENTION

The present invention relates to methods and related tools for assisting users in analyzing and identifying various constraints that limit the impact of business growth strategies, and for helping those users identify, research, and/or implement strategies in light of identified constraints. More particularly, the present invention relates to information management methods and tools for enabling managers to utilize accumulated information to identify and address constraints that otherwise limit innovation and growth of their business ventures.

BACKGROUND OF THE INVENTION

It is increasingly becoming a more common view among many analysts of modern competitive businesses and industries that the underlying governance structure and business processes that form the backbone of a given business entity will often be central to the execution and success of whatever competitive strategies that are implemented by that business entity. For example, how managers view the capabilities and challenges of their business can be dictated in large part by the organizational philosophy of their business entity, and these views in turn impact how they approach implementing the solutions to those challenges. Thus, the various factors unique and inherent to the philosophy of a given business entity, which is embodied by, among other things, managerial structure, governance style, business model, culture, and the like, interact in complex ways with a multitude of external factors from the competitive environment to determine the ultimate success or failure of any given competitive business strategy. In the world of business, a strategy that works well for one business in an industry could very well prove disastrous for a competitor.

Regardless of the philosophy used, it is a constant that successful innovation feeds growth. Therefore some sort of consistent innovation is necessary for long term success of any business. Conventionally, innovation is thought of as a discrete concept that encompasses the activities associated with generation and realization of new products and services. More evolved thinking, however, broadly defines innovation as including everything from coming up with and selecting ideas, developing and commercializing the ideas, and otherwise evolving a business through, for example, new marketing channels, new branding, and new business models.

The key for executives is to find ways to foster successful innovation that works for their business. While copying of market leaders is commonplace, competing successfully is not that easy. Executives and other high level managers cannot simply monitor the actions of their competitors and follow a practice of copying or otherwise adopting the successful business strategies and processes of their various competitors. Nevertheless, the continuous flow of information provided by the competitive marketplace, regarding market leaders as well as failures, should be leveraged to the full extent possible.

In this regard, business managers are trained to seek guidance by analyzing not just broadly focused industry data but also case studies that describe the circumstances of, strategic responses taken by, and results, obtained by similar companies under similar circumstances. These case studies may include anecdotal analyses regarding particular strategies that worked or did not work under a certain set of circumstances, and numeric financial studies supporting those analyses. To limit the risk in implementing a significant new strategy, business managers generally prefer to have first identified a case study concerning a similarly situated company, then have analyzed how that similarly situated company had successfully implemented similar strategic plan, and finally have concluded that at least some portions of that plan could be successfully adapted to the manager's needs.

Unfortunately, the positions of no two companies are absolutely identical, and case studies have the most relevance and usefulness to those companies that have similar situations to the company described in the case study. Therefore, in applying a case study approach it is necessary to identify appropriate case studies that have some similarity to and therefore the possibility of some applicability to the subject company's situation. Thus, executives and other business managers are left with the task of constantly trying to evolve and improve their internal business processes and infrastructure to spur innovation and growth while operating under a limited access to relevant and readily accessible information through which to review potential strategies.

Thus, there remains a need in the art for improved methods and tools for assisting today's managers in identifying, addressing and resolving the factors that hinder the innovation within, and thus the growth and profitability of, their businesses. It would be advantageous if such methods and tools were capable of assisting users in diagnosing the innovation-hindering factors of a subject business as well as capable of providing users with the ability to locate easily and study the types of available competitive and market information that managers need to assess new strategies to improve innovation. Such methods and tools that would allow easy identification of and simplified and objective analysis of various pro-innovation strategies that potentially may be used managers to unleash innovation could provide significant value realization.

SUMMARY OF THE INVENTION

In light of the above needs, it is an object of the present invention to provide methods and related tools for facilitating the identification of innovation constraints within a subject company (i.e., a company or business unit that is being investigated for the purposes of improving innovation).

Additionally, it is an object of the present invention to provide electronically enabled tools adapted to help business managers and other users identify constraints to innovation that are effecting a subject business, and review collected and cross-linked archived information that concerns potential constraint minimization strategies. In this manner, the managers would be assisted in identifying appropriate ones of said strategies and in developing suitable action plans for addressing the identified constraints in accord an applicable organizational philosophy of the subject business.

Furthermore, it is an object of the present invention to provide a tool for innovation constraints identification and analysis that is usable to organize a large quantity of historical market and competitor information and analyses relevant thereto.

Additionally, it is an object of one or more embodiments of the present invention to provide an electronic system, computing tool and related methods that retain a compilation of case studies that are organized according to various constraint minimization strategies such that case studies bearing relevance to the position of a subject business can be identified within a large archive of strategic information.

To achieve these and other objects, embodiments of the present invention recognize that while there are many challenges and obstacles to innovation, a certain subset of those challenges and obstacles appear frequently and significantly across many different industries and business types. Therefore, in embodiments of the present invention, a plurality of commonly occurring constraints to innovation are identified and then used a means for categorizing market and case study information. For example, common constraints that may be used for such categorizing according to different embodiments of the present invention can include a shortage of good ideas, a propensity to generate ideas with too little potential, an inability to select the best ideas to pursue, quitting too soon on ideas that competitors later make work, and an inability to turn ideas into sales, contracts, or other revenue sources.

In preferred embodiments of the present invention, the plurality of constraints are used in conjunction with a constraint minimization strategy tool, an electronic diagnostic running on a computing environment that helps managers to quickly identify the constraints that impede innovation in there respective companies, and also helps them to then proceed to identify and implement appropriate strategies for addressing the identified constraints to improve innovation. In particular, identifying key constraints enables companies to thereafter use the constraint minimization strategy tool to perform systematic research to identify appropriate business strategies—removing the need to manage by instinct, anecdote, or trial and error.

The constraint minimization strategy tool is a software program that includes various modules that intercommunicate to provide outputs useful in assisting a user (such as a business manager or third party strategy consultant working on behalf of a subject company) in identifying, investigating, and implementing potentially useful constraint minimization strategies. The software program may be loaded into and run on a computing system and perform the information archiving, cross-linking, and retrieval/display functionalities as described herein. The modules include a constraint minimization strategy application and database modules including a record cross-linking module and a strategic information repository module. The record cross-linking module of the tool enables users to navigate various documents, files, and other compiled records stored by the strategic information repository module, which repository contains files and documents of various types and levels of detail that provide various types of information concerning constraint minimization strategies. Preferably, the files and documents of the repository includes information and data concerning instances where relevant constraint minimization strategies have been employed in the past such that the user can analyze whether a particular constraint minimization strategy could work for a subject company.

According to preferred embodiments of the present invention, a plurality of constraints are identified, with each constraint belonging in one of a plurality of constraint categories. Most preferably, those constraint categories include ideation constraints, selection constraints, development constraints, commercialization constraints, and cycle-wide constraints.

In further preferred embodiments of the present invention, the constraint minimization strategy tool utilizes a plurality of innovation philosophies as additional categories into which to sort the archived market and case study information. These categories can include organization-focused philosophies that range from a highly centralized, top-down management approach that draws heavily on executive clout, to a highly distributed approach that relies extensively on contributions from throughout the organization, and include value chain-focused philosophies that encompass approaches that rely upon suppliers or partners to provide innovation as well as approaches that monitor customer needs closely and directly to drive their innovative efforts. These innovation philosophies generally reflect the overall culture and business model of the subject business. Therefore, while any subject company will have a number of elements in common with many of the innovation approaches, oftentimes the subject company, on an organization-wide basis, will tend to favor one of the approaches.

In such preferred embodiments of the present invention, the constraint minimization strategy tool uses a mapping of these selected common constraints and philosophies provided by the record cross linking module to link to the strategic information repository via appropriate constraint-philosophy summary records. Each such constraint-philosophy summary record comprises a summary-level compilation of all information (files and documents) in the strategic information repository concerning the relevant constraint and philosophy pairing. In this manner, a user of the strategy tool is provided with a substantially simplified way to identify possible constraint minimization strategies that may be useful for the subject company, and in the most preferred situations, is also provided with relevant guidance from the repository—culled from past real-world situations concerning the customization and implementation of constraint minimization strategies suitable for the subject company.

The mapping thereby enables the constraint minimization strategy tool to link the plurality of constraints and philosophies completely with the strategic information repository. The constraint-philosophy summary records, also stored in the repository, serve as an intermediary between the mapping and the full contents of the repository as there is one constraint-philosophy summary record for each constraint-philosophy pair, and each such summary record contains summary information regarding all of the potential constraint minimization strategies stored in the repository that may be used to improve the innovation performance of a company meeting the criteria of the constraint-philosophy pair in question. In this regard, potentially relevant constraint minimization strategies can be identified and researched by utilizing the tool to cross-reference each constraint-philosophy summary record associated by the mapping with: an innovation philosophy associated with or utilized by the subject company, a constraint believed to be hindering innovation in the subject company, or both. In preferred embodiments of the present invention, the constraint-philosophy summary records include descriptions of any constraint minimization strategies relevant to a given constraint and philosophy pairing, and those records can reference and/or hyperlink to for one or more of said relevant constraint minimization strategies information and data presented in full form in other documents and files, such as high-level commentaries or published analyses by third parties, case studies, implementation plans, integration implications, sample benefit and impact forecasts and other relevant information pertaining to the understanding, assessment and implementation of that particular strategy. In this manner, a user of tools according to the present invention is provided with a substantially simplified way to identify constraints that may be impacting innovation by a subject company, and a manner by which to locate and review a large quantity of relevant information concerning possible constraint minimization strategies that may be helpful to or otherwise of interest to a subject company (including, for example, guidance regarding the selection and implementation of those strategies).

The information and data for each constraint minimization strategy can be, for example, organized into a constraint minimization strategy overview file. These overview files could be made accessible by the constraint minimization strategy tool via appropriate constraint-philosophy summary records, and can describe in detail any one or more of interviews or published articles about the strategy in question, detailed case studies, implementation plans, and the like. The case studies, for example, may provide data concerning financial benefits that have been achieved using the constraint minimization strategy in question by the studied company. In this manner, constraint minimization strategies that are potentially useful to a given subject company can be easily identified, and all available information and data explaining those strategies can be readily located and reviewed such that appropriate strategies can be selected for implementation.

Such embodiments of the present invention take advantage of the fact that having a particular innovation philosophy (or adopting characteristics of a particular innovation philosophy) will require a subject company to address certain constraints differently than if other innovation philosophies were utilized by the subject company. Furthermore, a given innovation philosophy sometimes can have inherent advantages whereby it enables a subject company to address particular constraints, or entire constraint categories, more effectively than other innovation philosophies. For example, innovation that is driven by a top management philosophy can cut through internal politics and nail down resource priorities, but that philosophy doesn't work as well at driving the identification of profit-oriented new ideas that may originate from lower-level employees or even customers. Thus, the constraint-philosophy mapping used in such preferred embodiments of the present invention is particularly effective in organizing the repository of strategic information.

In this regard, while it is conventionally recognized that no innovation philosophy can solve all problems, the present invention assists companies in embracing the right philosophy for the current circumstances, and leveraging that philosophy to its fullest extent by adopting appropriate strategies to minimize key innovation constraints effectively within that philosophy, thus clearing away constraints that obstruct innovation. The present invention therefore provides a tool for helping managers of a subject company, or third party consultants on behalf of a subject company, to identify pro-innovation strategies that match an appropriate innovation philosophy for the subject company and work to remove the bottlenecks caused by the particular innovation constraints that are plaguing the subject company.

In this regard, a first aspect of the present invention includes a method for improving innovation strategies of a subject business. The method includes defining a plurality of innovation constraints and innovation philosophies, and collecting strategic information concerning innovation activities within one or more given industries. The strategic information is cross-referenced with a plurality of constraint minimization strategies, and constraint minimization strategy overview files are compiled for each of the constraint minimization strategies and stored in a strategic information repository. The method also includes linking the overview files in the strategic information repository with relevant pairings of the constraints and philosophies to produce a mapping of the strategic information repository. Further, the method identifies one or more of the defined philosophies, or one or more of the identified constraints, as being relevant to the subject company, and then uses the mapping to locate overview files in the strategic information repository corresponding to the one or more identified constraints and the one or more identified philosophies of the subject company and reviewing the located overview files to identify potential constraint minimization strategies that may be useful to the subject company.

Further, a second aspect of the present invention relates to a computer readable medium having computer readable code thereon for assisting a user in improving innovation strategies of a subject company by leveraging a archive of strategic innovation information. The medium includes definitions of plurality of innovation constraints and innovation philosophies, and a strategic information repository. The repository comprises a collection of strategic information concerning innovation activities within one or more given industries. This strategic information is cross-referenced in the medium with a plurality of constraint minimization strategies and compiled into constraint minimization strategy overview files for each of the constraint minimization strategies. The medium further includes instructions for linking the overview files in the strategic information repository with relevant pairings of the constraints and philosophies to produce a mapping of the strategic information repository. Further instructions in the medium permit a user to navigate the mapping to locate overview files in the strategic information repository corresponding to one or more identified constraints and one or more identified philosophies relevant to the subject company. Also, the medium includes instructions for permitting the user to review the located overview files to identify potential constraint minimization strategies that may be useful to the subject company.

Additionally, a third aspect of the invention includes a computing system adapted to assisting a user in improving innovation strategies of a subject company by leveraging an archive of strategic innovation information. The computing system includes a memory, a processor, a persistent data store, a communications interface, and an electronic interconnection mechanism coupling the memory, the processor, the persistent data store, and the communications interface. The persistent data store contains a database storing definitions of plurality of innovation constraints and innovation philosophies, and further contains a strategic information repository comprising a collection of strategic information concerning innovation activities within one or more given industries. The strategic information is cross-referenced with a plurality of constraint minimization strategies and compiled into constraint minimization strategy overview files for each of the constraint minimization strategies. The memory is encoded with a constraint minimization strategy application that, when performed on the processor, provides a process for causing the computing system to perform various operations. The operations include linking the overview files in the strategic information repository with relevant pairings of the constraints and philosophies to produce a mapping of the strategic information repository. Additionally, the operations include permitting a user to navigate the mapping to locate overview files in the strategic information repository corresponding to one or more identified constraints and one or more identified philosophies relevant to the subject company. Further, the operations include permitting the user to review a display of the located overview files to identify potential constraint minimization strategies that may be useful to the subject company.

The various embodiments of the invention having thus been generally described, several illustrative embodiments will hereafter be discussed with particular reference to several attached drawings.

BRIEF DESCRIPTION OF THE DRAWINGS

FIG. 1 is a schematic diagram showing a constraint minimization strategy map according to an embodiment of the present invention.

FIG. 5 is schematic diagram showing an example of a hyperlinked and modified constraint minimization strategy map used as a graphical navigation interface by electronic constraint minimization strategy tools according to preferred embodiments of the present invention.

DETAILED DESCRIPTION OF THE PREFERRED EMBODIMENTS

Figure 2:
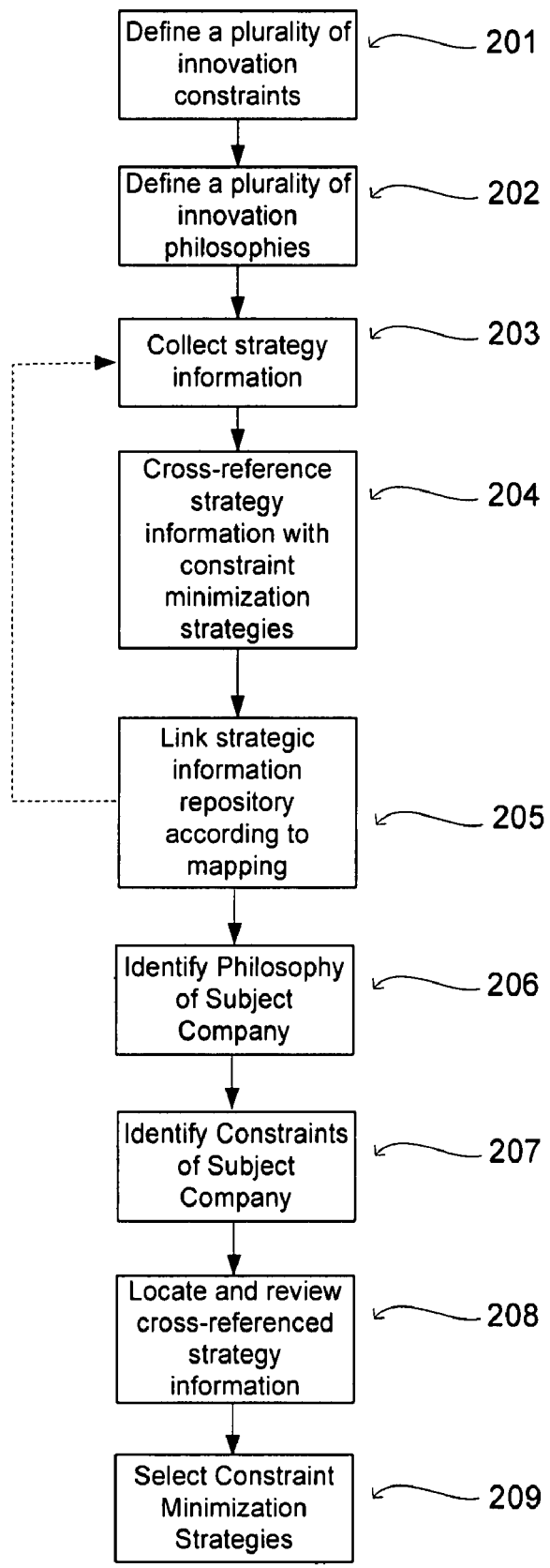
FIG. 2 is a flow diagram showing a constraint minimization process according to an embodiment of the present invention.

As noted above, preferred embodiments of the present invention comprise an electronic constraint minimization strategy tool that leverages an archived repository of strategic information (e.g., business strategies, marketplace information, etc.) to assist users to not only diagnose a subject company to identify its innovation constraints, but also to research and select appropriate constraint minimization strategies to combat those constraints. While it is understood there is a large number of different innovation constraints to be produced from all the possible combinations of different businesses, markets, and business philosophies, it is possible to identify that a certain subset of those different innovation constraints appear frequently and significantly across many different industries and business types. Embodiments of the present invention operate by selecting a plurality of common and key constraints to innovation and then using those constraints as a means for categorizing and cross-referencing the various documents and files that fill the strategic information repository. In preferred embodiments of the present invention, the repository information is further categorized according to a subset of common organizational philosophies. FIG. 1 is a schematic diagram showing a constraint minimization strategy map 100 according to one such preferred embodiment of the present invention.

Since the map 100 represents a two-dimensional sorting of information, it is represented in FIG. 1 in a structure similar to a conventional table. As depicted in the map 100, a plurality of common constraints 101 (essentially, defining various rows of the map 100) provide a first dimension into which the strategy information may be classified, while a plurality of innovation philosophies 107 (essentially, defining various columns of the map 100) provide a second dimension into which the strategy information may be classified. Common constraints that may be used for categorizing according to different embodiments of the present invention can include a shortage of good ideas, a propensity to generate ideas with too little potential, an inability to select the best ideas to pursue, quitting too soon on ideas that competitors later make work, and an inability to turn ideas into sales or contracts. The seventeen different constraints 101 depicted in FIG. 1 are one particularly preferred subset as they are believed to be commonly occurring and significant constraints.

As shown in FIG. 1, the constraints 101 are organized into a plurality of constraint categories that largely correspond to the different types of innovation that those constraints effect. In particular, each constraint 101 is indicated as belonging to one of five constraint categories that include ideation 102, selection 103, development 104, commercialization 105, and cycle-wide 106. Understandably, this organization into like categories of constraints makes map 100 more organized and, as will be readily appreciated by one skilled in the art after reading the present disclosure in full, makes it easier for users of the constraint minimization strategy tools of the present invention to use the map 100 to identify constraints that may be effecting the subject business.

In similar fashion, the philosophies 107 can be divided into two categories: organizational focus philosophies 108, and value chain focus philosophies 109. The various philosophies 107 depicted in map 100 in preferred embodiments of the invention are described in detail below to help explain how they are used in conjunction with constraints 101 to categorize strategy information in embodiments of the invention.

As depicted in FIG. 1, the organizational focus philosophies 108 in that particular embodiment of the invention includes a top management-led philosophy, an internally networked philosophy, and a distributed philosophy. The top management-led philosophy relies upon the core belief that speed to market and overall business effectiveness are improved when senior executives use their power within the company to shepherd resources and lead innovation initiatives.

Understandably, when the chief executive or some other high level manager takes responsibility for innovation, certain constraints, such as funding shortfalls and other common bureaucratic "red tape," can quickly become non-issues. Senior executives base programs on this approach when they have adequate resources available but need to push essential innovations through the company with a minimum of organizational resistance.

However, there is a definite limit upon how far organizations can leverage this approach. Among other things, it can place major demands on an extremely limited resource—the time and attention of top management. This approach can also unwittingly send the message that bottom-up initiatives are not welcomed. As a result, executives tend to employ this philosophy when it is the highest and best use of their energy—when no other philosophy will get the job done.

The second type of organization-based philosophy in preferred embodiments of the present invention is the internally networked philosophy. This philosophy is based upon the core belief that innovation best flourishes when better linkages across teams and parts of the organization provide greater access to organization resources (e.g., skills, processes, customer channels, and funding). Senior executives employ this philosophy when organizational silos keep them from combining their company's existing talents and expertise in valuable new ways. A common tactic utilized by some companies that use this philosophy is for senior management to bring business leaders from different parts of the company together to share information and insights. By way of example, retail chain establishments can encourage managers of different store locations (which locations conventionally operate as independent entities relative to one another) from across the company to regularly interact by phone and e-mail to swap ideas for boosting revenues and reducing costs.

When employing this particular innovation philosophy, companies often are able to innovate while keeping the degree of direct involvement by top-level management in internal networking relatively low. Top managers participate indirectly by encouraging such interaction—they essentially make the decision to actively push the increased connectivity further down in the organization. Spreading an internally networked philosophy throughout a company can be difficult, however, as it requires a specific set of capabilities, including expert organizational navigation and speed. Dangerous pitfalls introduced by this philosophy include that, without effective governance processes, there is the chance that initiatives become so decentralized to the point that no one can make final decisions. Furthermore, the decentralized structure may cause confusion as employees must know how to identify the proper contact person and final decision makers.

The third and final type of organization-based philosophy used for performing mappings in preferred embodiments of the present invention is the distributed philosophy. The core belief of this philosophy is that innovation opportunities are maximized when responsibility for innovation is driven down into the components of the business organization, even to the level of each employee. In this philosophy, there's no central think tank for developing all ideas. Each employee is encouraged to think about new ideas that work. Executives embrace this philosophy when current decisions need to be made at numerous points in the organization and when there is inadequate time for coordination or management oversight. To make this model work, companies staff up with innovators and give them the responsibility to make major decisions.

A significant benefit of the distributed innovation philosophy is that it makes good use of the talents of individuals and small groups. In doing so, the organization does not have to slow down to coordinate with or take advantage of what other business units are doing. However, the distributed philosophy has its limitations. For example, it may not be well suited to delivering consistent services globally, which requires a high degree of coordination across business units.

Referring again to FIG. 1, it can be seen that value chain-focused innovation philosophies used for mapping according to preferred embodiments of the invention include a supplier-driven philosophy, a partner-intensive philosophy, a competitor-driven philosophy, and a customer driven philosophy. Companies that employ a supplier driven philosophy typically share a core belief that suppliers are a very important, but relatively undervalued and untapped, source of rapid and low-cost innovation. A major advantage of promoting supplier-driven innovation is that it allows those companies to develop important new capabilities and products without having to make all the investments or generate all the ideas themselves. They thus pass much of the capital-investment requirement to suppliers, gaining the business financial flexibility by replacing fixed costs with variable costs.

Retailers frequently and successfully use this approach to reinvigorate their product selection and even their store set-ups, such as via novel supplier-branded offerings and store-in-store formats. In fact, large retail chains not only await innovation to come from their suppliers, but also frequently ask their suppliers to innovate in certain areas when the management of the retail chain decides there is need for improvements in those areas. For example, a grocery store chain may ask all of their suppliers to develop new ways to package certain perishable items to improve shelf life, and even at times specifically entice innovation in a particular area by offering larger supply contracts to the suppliers that come up with the best solution.

A heavy reliance on external sources imposes certain costs, however, including a diminished ability to remain differentiated. To prevent a supplier from selling the same product or solution to several competitors, a company will likely have to pay for exclusive rights.

The second value chain-focused philosophy utilized by the innovation strategy tool for mapping in preferred embodiments of the present invention is the partner-intensive (or partner-oriented) philosophy. This philosophy is based upon the core belief innovation processes yield better results when they are opened up to external organizations that act as partners in the resulting innovation. The partner-oriented philosophy also draws on external capabilities and resources. This philosophy is often advantageously used in circumstances where executives want their companies to be able to leverage ideas, expertise, talent and resources that are in short supply or unavailable in their own organizations, and where executives want to take advantage of opportunities to innovate without the shouldering all the risk. While similar to the supplier-driven approach in its reliance on other companies, the partner-oriented philosophy stresses co-innovation rather than purchasing ready-made solutions.

In industries such as high-tech and pharmaceuticals, this approach enables management to enter new markets months or even years sooner than they could if they were operating on their own. For example, a company that develops a certain medical implant may not have the expertise to develop surgical devices necessary to properly install the implant. Instead of building a new development team from scratch, the innovator of the medical implant could instead partner with a company that has a staff of experienced people ready to begin work on surgical devices, shortening critical time to market while sharing the financial burden of research and development.

A partner-oriented philosophy of course presents some unique drawbacks. One significant issue stems from the issue of control. Many organizations are loathe to relinquish control, and established institutional prejudices can make it difficult to get internal support for externally based projects. In addition, since key people and other resources are typically controlled by an outside entity when this philosophy is pursued, executives need to develop new skills that help them manage important external projects.

The next value chain-based philosophy utilized by the innovation strategy tool for mapping in preferred embodiments of the present invention and depicted in FIG. 1 is the competitor-driven philosophy. Companies that follow this philosophy are generally "fast-follower" organizations that believe that strong profits can be realized by further innovating and refining what first-to-market competitors introduce as opposed to taking a market lead. Fast-follower organizations specialize in starting the innovation process at the development stage and bypassing the idea generation stage. They let others come up with the initial ideas, then reverse engineer them, improve them, or implement them so that their offerings are of a higher quality at a more competitive price. In essence, Asian companies that began to dominate the US electronics and automobile markets in the 1980s did so by being fast-followers.

The competitor-driven philosophy focuses attention on the power and importance of development and commercialization in the normal innovation process (i.e., ideation, to selection, to development, to commercialization). Executives can utilize this philosophy when they do not have the time or funding to experiment, when their companies lack the human capital and creativity to come up with new ideas that work, or when they are just simply behind in an attractive market.

Companies that use this philosophy require fast and effective engineering and sleek delivery processes, and it is advantageous if they can leverage market position to limit the typical disadvantages of not being the first-to-market. However, fast-follower companies have very little ability to control pricing or the pace of new product introductions. When markets are changing quickly, competitor-driven innovators can struggle to keep up. Further, fast-followers may lag in invention, but they typically must lead in commercialization, offering products and services that are truly differentiated in convenience, reliability and price.

The fourth and final type of value chain-based philosophy used for mapping in preferred embodiments of the present invention is the customer-driven philosophy. The core belief characterizing companies employing this innovation philosophy is that profitable innovation can be effectively driven by a close connection to customers that in turn provides a deep understanding of the true wants and needs of the market. In essence, it encourages companies to work with customers to identify unmet needs and test new solutions. Along the way they can lay out a value proposition that will attract others, provide testimonials and even help fund development. In short, this philosophy focuses on taking some of the guesswork out of innovation. To the extent that customers have already expressed an interest in buying, this philosophy also allows for the rapid commercialization of innovative ideas and reduces risk.

Despite its appeal, customer-driven innovation has its drawbacks. To begin with, companies that are tied closely to existing customers frequently fail to take adequate notice of disruptive technologies at their peril. Further, being customer-driven is not the same as being market-driven. Indeed, the danger of becoming overly exposed to your direct customer's view of the market is that one could lose sight of other important growth opportunities.

Understandably, businesses are not necessarily stuck using one of the above seven organizational philosophies across their entire organization forever. A business can shift among different organizational philosophies at different times in response to industry trends, or even adopt different philosophies across different business units. For example, one well-regarded consumer electronics company built its reputation initially with imaginative must-have products. Its key constraint during this time was the pace of development, which it addressed with a distributed philosophy of innovation. As its existing markets matured, however, the company found incremental sales were becoming ever harder to achieve. Management responded by shifting to a partner-intensive philosophy, which would help it break into new market spaces. By opening itself to working with new business allies that helped it penetrate new markets, the company was able to continue its long history of innovation.

In this regard, while it is conventionally recognized that no innovation philosophy can solve all innovation problems, it also should be understood that it is of course advantageous for a business to embrace the best philosophy for the current circumstances, and to leverage that philosophy by adopting appropriate strategies to address constraints inherent to that philosophy that obstruct innovation. The present invention is therefore helpful in this endeavor as it provides a tool for helping managers of a subject company to identify pro-innovation strategies that match an appropriate innovation philosophy for the subject company and work to remove the bottlenecks caused by the particular innovation constraints that are plaguing the subject company.

The methods and related electronic tools according to embodiments of the invention use a mapping such as map 100 depicted in FIG. 1 to link the defined plurality of constraints 101 and plurality of philosophies 107 with the repository of strategy information, which information can contain documents and files providing high-level commentaries or published analyses by third parties, case studies, implementation plans, integration implications, sample benefit and impact forecasts and other relevant information and data pertaining to the understanding, assessment and implementation of that particular strategy. Understandably, a particular case study or other like document, file, or association of data in the strategy information could be relevant to more than one constraint, more than one philosophy, or both. Thus, the cross-referencing performed by the mapping would not necessarily require data within the strategy information to be force fit into one constraint-philosophy pairing (i.e., one box in the table of map 100). The check-mark indicators 110 depicted in various ones of the boxes in map 100 represents a cross-reference made by the map 100 to some specific set of data in the strategy information repository. For example, one can conclude from the map 100 that the repository includes strategy information concerning the constraint "We have too few ideas" for all but the "Top-Management Led" and "Competitor Driven" organizational philosophies," while the strategy information appears to span all seven philosophies for the constraint "Our idea-to-profit cycle is low." How the cross referencing represented by indicators 110, and thus the relational database characteristics of the map 100, works in preferred of the invention will be illustrated below.

For each indicator 110, the repository would have a constraint-philosophy summary record which in turn would summarize and organize (such as by providing hyperlinking access) overview files for all relevant constraint minimization strategies that are relevant to the constraint-philosophy pairing in question.

Turning now to FIG. 2, there is depicted a flow diagram showing a constraint minimization process 200 according to a particular embodiment of the present invention. It will be appreciated by those of ordinary skill in the art that unless otherwise indicated herein, the particular sequence of steps described is generally illustrative only and, where apparent, can be varied without departing from the spirit of the invention. Thus, the steps can be performed in any convenient or desirable order. Further, while not explicitly depicted, it will be understood by one skilled in the art that various ones of the steps below are meant to be repeated regularly in order to maintain current data.

As depicted in the flow diagram of FIG. 2, process 200 begins with the configuration of the constraint minimization strategy tool, which can be envisioned as taking place in steps 201 through 205. As depicted in FIG. 2, the first step 201 is the administrator of the tool defining a plurality of innovation constraints to use for mapping. As described above, this preferably would be the seventeen constraints 101 identified in the map 100 of FIG. 1. In like fashion, step 202 comprises the administrator defining the plurality of innovation philosophies. Again, the preferred philosophies are as depicted in FIG. 1. However, it should be understood that any number of constraints or philosophies in excess of one each would work in more basic embodiments of the invention.

At step 203, the strategy information that forms the strategic information repository is collected as noted above. This information can take the form of documents, data, images, or other electronic files that are in some way relevant to constraint minimization strategies. These are then associated with relevant constraint minimization strategies, and subsequently compiled into constraint minimization strategy overview files. Typically, one unique constraint minimization strategy overview file would be created for each different constraint minimization strategy identified during this step, and the constraint minimization strategy overview file would then be stored, such as in a database, for access and use by the systems, tools and processes are herein described.

At step 204, the important task of cross-referencing the collected strategy information in the repository according to the constraint minimization strategies is performed by the administrator. This would include the matching of each such stored overview file with one or more constraint-philosophy pairings using a map as described above.

Next, step 205 proceeds with the administrator completes the constraint minimization strategy mapping by creating a plurality of constraint-philosophy summary records and using those summary records to link the various overview files with appropriate ones of the constraint-philosophy pairings. Such summary records likewise would be stored in an appropriate manner, such as a database in a strategic information repository module as described in further detail below.

As indicated by the dotted and backward flowing line connecting steps 205 and 203, it should be appreciated that steps 203-205 can be repeated in process 200 to update the repository and mapping whenever new information is added to the repository. In this manner, the constraint minimization strategy tool would provide the best assistance to user if the repository was maintained to have as complete and up-to-date records as possible. Understandably, a new mapping could likewise be created whenever the number and/or definition of the constraints or philosophies are modified.

Following completion of step 205, process 200 has prepared a strategic information repository and mapped that repository to constraints and philosophies in a manner that those elements can be used in combination to assess the state of a subject business and explore potential minimization strategies for improving the innovative performance of that subject business. At step 206, the user would first analyze the subject company to identify any relevant (e.g., one or more) philosophies from the list of philosophies used in the relevant mapping that would describe the innovative activities or mindset of the subject company. Any method of reviewing innovation and gaining information regarding the subject company can of course be used by managers during this identification step. Internal audits, interviews or surveys of middle and upper level management, of the type commonly used in business, can be used as indicated by the particular circumstances of the subject company.

A similar approach can be used to identify the constraints of the subject company at step 207. The plurality of constraints defined for use conjunction with a constraint minimization strategy tool helps users to quickly identify the constraints that impede innovation in a subject company. In particular, the defined key constraints enumerated in the mapping in and of itself can serve as a primer on common constraints for a given philosophy type. Further, the various constraint-philosophy summary accessible via the electronic tools of the present invention enables users to further understand basic symptoms of the key constraints. This makes the users better equipped to recognize constraints operating in a subject company when performing a diagnosis.

For example, internal awards nomination and reviewing procedures can be used by a given company to identify persons within a large company that are notably for their contribution to innovative accomplishments, whether in new products, management methods, approaches to selling, or other areas. Those identified could then be interviewed and their insights into the business' constraints and the competitive environment leveraged to identify where the remedial strategies or other changes may be needed.

As noted above, the information and data for each constraint minimization strategy of the repository is preferably organized into a constraint minimization strategy overview file that includes one or more of interviews or published articles about the strategy in question, detailed case studies, implementation plans, and the like. The case studies, for example, may provide data concerning financial benefits that have been achieved using the constraint minimization strategy in question by the studied company.

After the managers have identified relevant constraints to the subject business, they need to determine what actions to take, if any. At step 208, process 200 next proceeds with the user utilizing the mapping and repository to locate constraint minimization strategy overview files linked by the mapping with the identified constraints and/or philosophies from steps 206 and 207 and reviewing them. In this manner, constraint minimization strategies that are potentially useful to a given subject company can be easily identified, and all available information and data explaining those strategies can be readily located and reviewed such that appropriate strategies can be selected for implementation.

Finally, at step 209, process 200 concludes with the user selecting one or more constraint minimization strategies from the reviewed overview files. During this step, for example, the user could weigh whether they should confront the constraint head-on, devise means to work around the constraint, or revamp the overall approach to innovation based upon case studies or other information contained in the various overview files of the repository.

Figure 3:
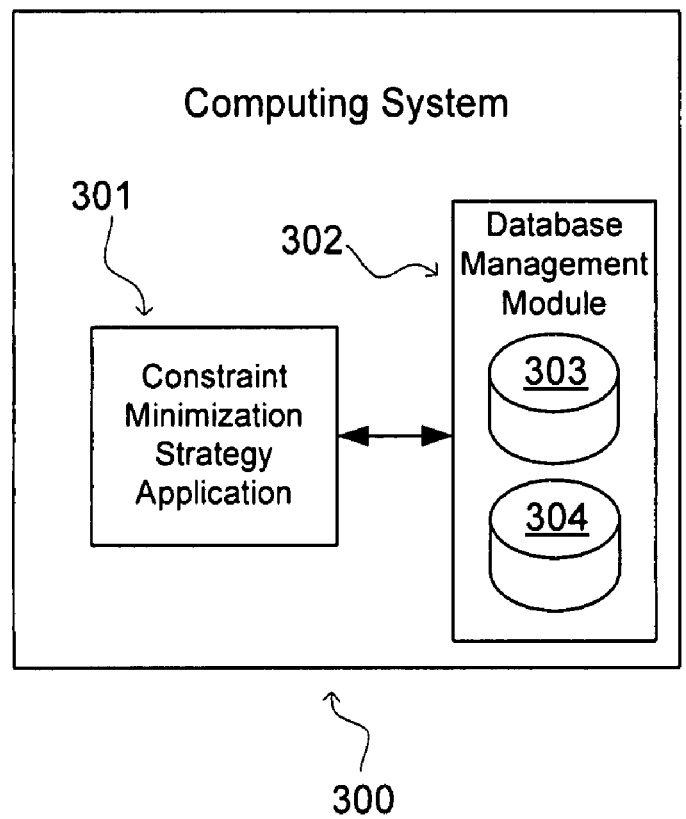
FIG. 3 is a schematic diagram showing a computer system supporting a constraint minimization strategy tool according to an embodiment of the invention.

FIG. 3 is a schematic diagram showing a computer system 300 supporting a constraint minimization strategy tool according to an embodiment of the invention. The computing system 300, for example, may comprise a network that contains various networking sub-systems to integrate various computing elements, such as servers, storage units, and various other electronics to establish a networking environment as are commonly used in the art. For example, suitable arrangements include any number of commercially available server machines, such as a SunServer, Compaq Proliant, or Dell Dimension, running a viable operating system, such as UNIX, Linux, or Windows NT, interconnected by routers, firewalls, and the like into a local area network ("LAN").

In the preferred embodiment as shown, computing system 300 includes at least one server capable of executing a constraint minimization strategy application 301. The server (not specifically depicted) running the application 301 is in communication with a database management module 302 to obtain necessary repository information while performing the functions as herein described.

The database management module 302 contains one or more databases (e.g., databases 303, 304) storing information in appropriate storage media. The storage media utilized in embodiments of the present invention are electronically connected to the database servers, and each database may store its data in any manner known in the art, such as directly on a server hard drive, or remotely on external storage media including tape drives, CD-RWs and writable optical disks, and remote hard drives.

A first database 303 could be used to serve as a strategic information repository that contains all the relevant documents and data collected for use by the tool, including the various constraint minimization overview files and various constraint-philosophy summary records. The second database 304 could store various definitions that serve to define the record cross linking of the mapping used to link various defined constraints and philosophies with the contents of the repository. One of ordinary skill in the art, however, will appreciate that any suitable number of databases can be used so long as the database management module stores the mapping, the constraint-philosophy summary records, and the constraint minimization strategy overview files needed by application 301.

It is envisioned that in certain embodiments of the invention that the tool would be implemented in a networked environment such that it can be accessed remotely, such as via the Internet. In such embodiments, the database management module can include a database server. Since standard SQL databases conventionally are not directly accessible via the Internet, a variety of HTML front-ending tools, such as ASP scripts, java scripts, VBScripts, or CGI scripts, may be incorporated within the serving software running on the database server. Thus, it should be appreciated that the constraint minimization strategy application 301 interacts with such front-ending tools to communicate with database management module 302 via SQL or other suitable data access languages to obtain the latest data whenever requested by an advertising administrator, network administrator, participating consumer, or the like.

As noted above, the cross-linking utilized by the tool enables users to navigate various constraint-philosophy records stored by the constraint-philosophy repository module. These records provide a short introduction to the constraint, examples of how the constraint negatively impacts innovation, and various types of introductory information concerning constraint minimization strategies that are in the repository and have been cross-referenced as being relevant to the constraint (i.e., the strategy is believed to have had either a negative or positive effect on the constraint). Preferably, the information of the constraint-philosophy records includes information and data concerning instances where relevant constraint minimization strategies have been employed in the past such that the user can analyze whether a particular constraint minimization strategy could work for a subject company.

The more detailed information and data for each constraint minimization strategy can be, for example, organized into a constraint minimization strategy overview file that includes one or more of interviews or published articles about the strategy in question, detailed case studies, implementation plans, and the like. The case studies, for example, may provide data concerning financial benefits that have been achieved using the constraint minimization strategy in question by the studied company. In this manner, constraint minimization strategies that are potentially useful to a given subject company can be easily identified, and all available information and data explaining those strategies can be readily located and reviewed such that appropriate strategies can be selected for implementation.

Figure 4:
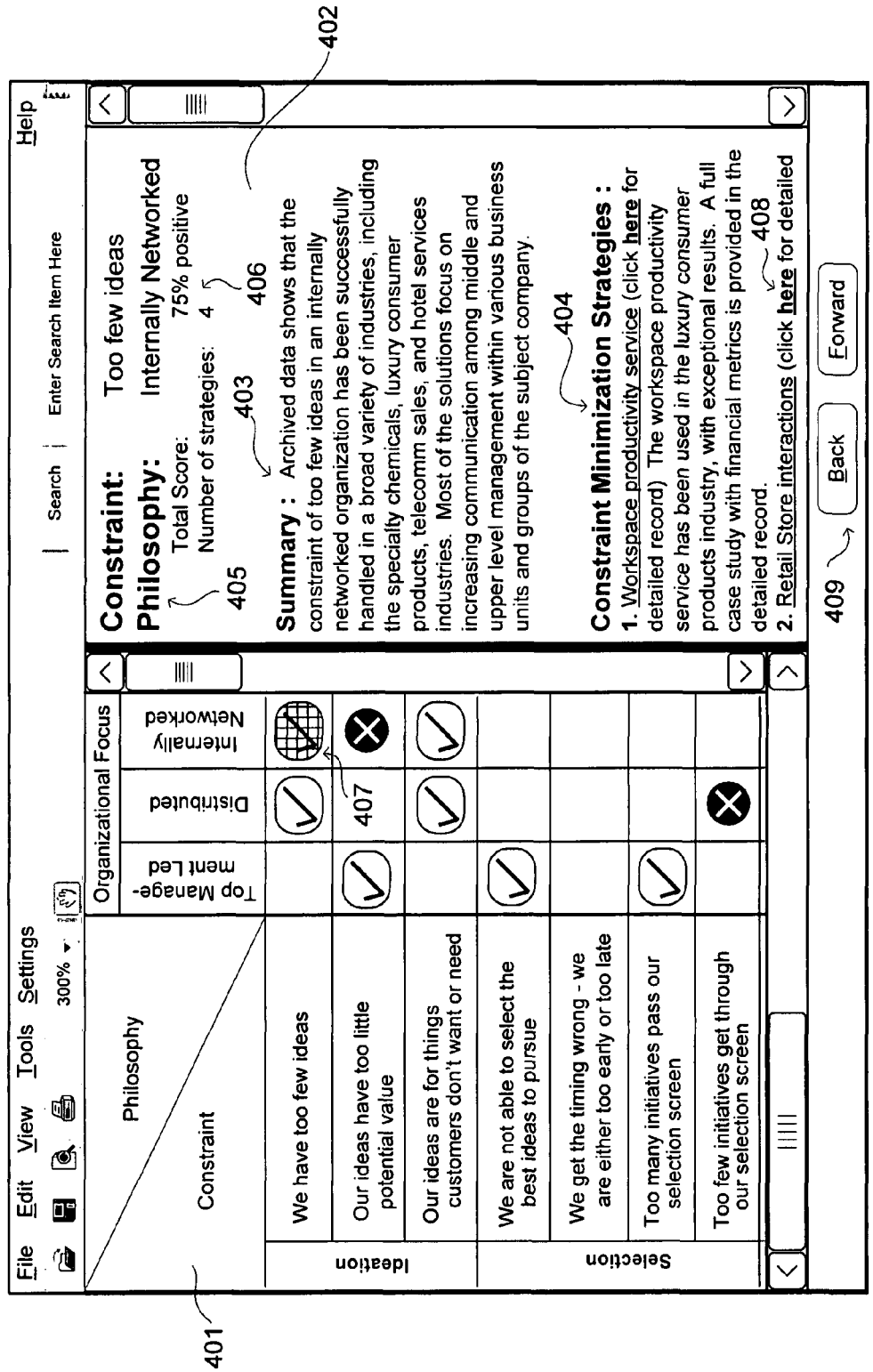
FIG. 4 is a first view of a suitable user interface that illustrates the visible operation of a constraint minimization strategy tool according to preferred embodiments of the present invention.

Referring now to FIG. 4, there is depicted a view 400 of a sample user interface from a constraint minimization strategy tool according to certain preferred embodiments of the present invention. The interface depicted in view 400 shows one preferred mechanism for enabling a user to explore information underlying the applicable constraint-philosophy strategy map in an intuitive manner. In particular, navigation window 401 of view 400 enables a user of the tool to utilize a common computer pointing device to browse through a hyperlinked depiction of a constraint-philosophy map, with various hyperlinks providing direct navigation to the cross-referenced constraint-philosophy records, which in turn provide navigation to the related and more detailed strategy overview files for underlying constraint minimization strategies. A user can thereby browse, for example, by looking at different constraint-philosophy records for particular constraints of interest, by looking at particular constraint-philosophy records for particular innovation philosophies of interest, or by selecting constrain-philosophy records based upon particular constraint and philosophy pairings. Understandably, this interface enables the constraint minimization strategy tool to be used not only after a particular constraint has been identified as needing to be alleviated via an appropriate strategy, but also during the process of actually determining what constraints are actually at work hindering innovation in the subject company (e.g., step 207 of process 200). For instance, if a subject company is a fast follower, a user could review each of the constraint-philosophy records falling under the "competitor-driven" philosophy column of the strategy map in order to gain understanding of how to recognize the types of constraints that commonly plague businesses operating with this philosophy. Therefore, navigation window 401 along a first side of the visual display utilizes a representation of the applicable constraint-philosophy map being used by the tool. The particular hyperlinked map 500 used in the tool of the embodiment depicted in FIG. 4 is depicted in full detail in FIG. 5.

As depicted in FIG. 5, instead of indicator 110 being used to represent the presence of a constraint-philosophy summary record in the repository for a given constraint and philosophy pair, icons 501 and 502 are utilized. First, it should be noted that icon 501 (in the example, bearing a check mark symbol) serves as a "positive" indication to a browsing user that, not only is there an underlying constraint-philosophy summary record, but that the relevant record on balance describes underlying constraint minimization strategies that evidence indicates have a positive impact on innovation. Conversely, icon 502 (bearing an "X" mark) serves as a "negative" indication to the user. In particular, icon 502 communicates that, while there is a constraint-philosophy summary record, the underlying constraint minimization strategies historically produce a negative impact upon innovation. It should be appreciated that, this negative information can be just as useful to the user in selecting and customizing minimization strategies for a subject company as positive information and, in particular, can be even more useful when the user is in the process of diagnosing constraints for a subject company.

In navigation window 401, these same depicted icons also serve as hyperlinks to navigate and explore the relevant constraint-philosophy records. Selection of a given icon in the map of window 401 (icon 407 being depicted as selected in view 400) causes the display window 502 along the right side of user view 500 to load and display the constraint-philosophy record linked to the selected constraint-philosophy pairing. As depicted in the drawing one or both of windows 401 and 402 can utilize scroll bars, zoom functions, and the like to help limit the size, appearance, and amount of information displayed in the view 400, and navigation buttons 409 to allow users to easily toggle among previously viewed records and files in the display window 402. The summary record depicted in display window 402 typically would include an initial title identifying the constraint-philosophy pair for the summary record (heading 405) and, optionally, a score 406 that can reflect, either numerically or qualitatively, how (i.e., positively or negatively) and to what extent constraint minimization strategies cross-referenced in the repository to that constraint-philosophy pair impact innovation. The summary record would also contain background information 403 summarizing the particular constraint-philosophy pairing and giving a brief indication of whether the totality of the real-world information available in the database indicates a propensity for success or failure by the archived constraint minimization strategies with regard to improving innovation and growth. The constraint-philosophy record would also typically include one or more short abstracts 404 regarding each constraint minimization strategy cross-linked by the tool to the constraint-philosophy pairing. Each abstract 404 would contain a hyperlink 408 to allow the user to view the complete overview file for the corresponding constraint minimization strategy in display window 402. Employing user view 400 to interact with the constraint minimization strategy tool in this manner, a user can thereby identify and explore any of the constraint-philosophy records or constraint minimization strategy records contained in the information repository of the electronic tool.

Figure 6:
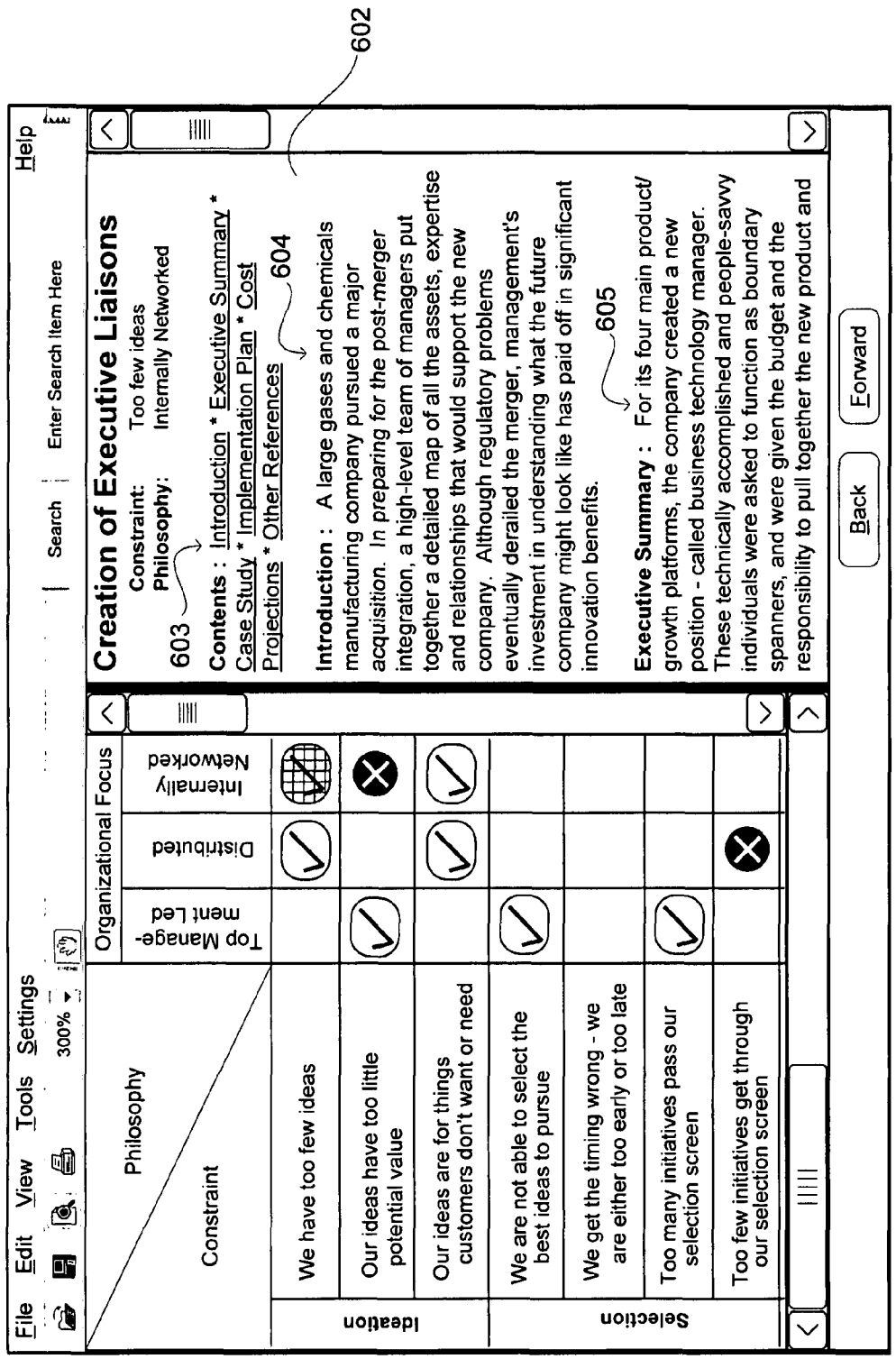
FIG. 6 is a second view of a suitable user interface that illustrates the visible operation of a constraint minimization strategy tool according to preferred embodiments of the present invention.

FIG. 6 depicts a second view 600 of a user interface of the constraint minimization strategy tool that may be displayed to a user when the user elects to review a detailed constraint minimization strategy overview file of interest. A user could reach view 600, for example, by selecting one of the hyperlinks 408 that pertains to a particular constraint minimization strategy of interest. As shown in FIG. 6, view 600 is substantially the same as previously described view 400 except that in display window 602 the detailed overview file for a constraint minimization strategy of interest (i.e., the creation and use of executive liaisons to minimize the constraint of "Too few ideas" in a business using an "Internally networked" philosophy) is displayed as opposed to the more high-level constraint-philosophy summary record. The overview file appears in display window 602 as a document containing various sections. There also can be hyperlinks embedded within this document for viewing additional related information. A detailed constraint minimization strategy overview file can, as depicted in view 600, include, for example, a table of contents 603 identifying various sections of the detailed record document and which can provide a mechanism for jumping directly to a particular section within that document. Sections of a constraint minimization strategy detailed document can include, for example, a Definition of the strategy, an Introduction 604, an Executive Summary 605, a description of Sample Benefits, detailed Case Studies, a listing of Contact Persons, and Research Footnotes or other cross-references to external information sources. A user can thereby scroll down and review relevant portions of the overview document and access various case studies and other relevant information to determine whether a given constraint minimization strategy is appropriate for the subject company.

As noted previously, constraint minimization strategy overview files each provide summaries of, and preferably detailed analysis of, potential constraint minimization strategies that may be used to improve the innovation performance of a subject company. After reviewing one or more of these constraint minimization overview files, potentially relevant constraint minimization strategies can be identified and then researched by cross-referencing the constraint-philosophy records with an innovation philosophy associated with or utilized by the subject company, with a constraint believed to be hindering innovation in the subject company, or both. These overview files can contain for the subject constraint minimization strategy case studies, implementation plans, integration implications, sample benefit and impact forecasts and other relevant information pertaining to the understanding, assessment and implementation of that particular strategy. In this manner, a user of tools according to the present invention is provided with a substantially simplified way to identify constraints that may be impacting innovation by a subject company, and a manner by which to locate and review a large quantity of information concerning possible constraint minimization strategies that may be helpful to or otherwise of interest to a subject company (including, for example, guidance regarding the selection and implementation of those strategies).

Various processes of the methods described herein may be implemented using software stored in the memory of a computing device for execution by suitable processors. Alternatively, the mobile devices and/or servers may implement such processes and methods in hardware or a combination of software and hardware, including any number of processors independently executing various programs and dedicated hardware, such as application specific integrated circuits (ASICs), field programmable gate arrays (FPGAs), and the like.

Having described preferred embodiments of the invention, it will now become apparent to those of ordinary skill in the art that other embodiments incorporating these concepts may be used. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as will be claimed.

The invention claimed is:

1. A method for improving innovation strategies of a subject company, said method comprising:
   providing a system comprising
      a memory,
      a processor,
      a persistent data store,
      a communications interface,
      an electronic interconnection mechanism coupling the memory, the processor, the persistent data store, and the communications interface, and
      distinct software applications embodied on a computer-readable medium;
         wherein the distinct software applications comprise a definition application, a database and strategic information repository application, and a constraint minimization strategy application; and
         wherein the distinct software applications are configured to access the memory; and
   executing instructions from the memory to perform a process on the processor of:
      defining, by the definition application, a plurality of innovation constraints and innovation philosophies;
      collecting strategic information concerning innovation activities within one or more given industries, cross-referencing said strategic information with a plurality of constraint minimization strategies, compiling constraint minimization strategy overview files for each of said constraint minimization strategies, and storing said overview files in a strategic information repository, the collecting, cross-referencing, compiling, and storing performed by the database and strategic information repository application;
      linking, by the constraint minimization strategy application, said overview files in said strategic information repository with relevant pairings of said constraints and philosophies to produce a mapping of said strategic information repository, wherein said linking of said overview files comprises providing access to constraint-philosophy summary records for each pairing of said defined constraints and said defined philosophies, said summary records comprising documents that summarize and organize ones of said overview files that correspond to constraint minimization strategies that are relevant to a constraint-philosophy pairing in question, and said repository containing a unique summary record for each said constraint-philosophy pairing;

identifying, by the constraint minimization strategy application, one or more of said defined philosophies, or one or more of said identified constraints, as being relevant to said subject company;

using said mapping by the constraint minimization strategy application to locate overview files in said strategic information repository corresponding to said one or more identified constraints and said one or more identified philosophies of said subject company; and reviewing said located overview files to identify potential constraint minimization strategies that may be useful to said subject company.

2. The method according to claim 1, wherein said constraint-philosophy summary records stored in said repository serve as an intermediary that links the minimization strategies with relevant constraint-philosophy pairings defined by the mapping.

3. The method according to claim 1,
wherein said strategic information repository includes one constraint-philosophy summary record for each constraint-philosophy pairing, and
wherein each such summary record contains summary information regarding all of the potential constraint minimization strategies stored in the repository that may be used to improve innovation performance of a company meeting criteria of the constraint-philosophy pair in question.

4. The method according to claim 3, wherein said constraint-philosophy summary records provide active electronic links to one or more relevant ones of said constraint minimization strategy overview files.

5. The method according to claim 1, further comprising browsing said constraint-philosophy summary records during said identifying of said constraints or said identifying of said philosophies for said subject company.

6. The method according to claim 5, wherein said browsing comprises performing activities selected from the group consisting of
reviewing summary records for particular constraints of interest,
reviewing summary records for particular innovation philosophies of interest, and
reviewing summary records based for particular constraint-philosophy pairings of interest.

7. The method according to claim 1, wherein said constraints are organized by said mapping into categories of constraints selected from the group consisting of ideation constraints, selection constraints, development constraints, commercialization constraints, and cycle-wide constraints.

8. The method according to claim 1, wherein said philosophies are organized by said map into categories of philosophies selected from the following group: organization-focused philosophies and value chain-focused philosophies.

9. The method according to claim 1, wherein each of said constraint minimization strategy overview files comprises information and data presented as documents and/or data describing a given constraint minimization strategy for the given overview file.

10. A computer readable medium having computer readable code thereon for assisting a user in improving innovation strategies of a subject company by leveraging an archive of strategic innovation information, the medium comprising:
definitions of a plurality of innovation constraints and innovation philosophies;
a strategic information repository comprising a collection of strategic information concerning innovation activities within one or more given industries, said strategic information being cross-referenced with a plurality of constraint minimization strategies and compiled into constraint minimization strategy overview files for each of said constraint minimization strategies;
instructions to link said overview files in said strategic information repository with relevant pairings of said constraints and philosophies to produce a mapping of said strategic information repository, wherein said link is performed by constraint-philosophy summary records stored in said strategic information repository,
said strategic information repository containing one of said summary records for each pairing of said defined constraints and said defined philosophies, and
said summary records each comprising documents that summarize and organize ones of said overview files that correspond to constraint minimization strategies that are relevant to a constraint-philosophy pairing in question;
instructions to permit navigation of said mapping to locate overview files in said strategic information repository corresponding to one or more identified constraints and one or more identified philosophies relevant to said subject company; and,
instructions to permit reviewing of said located overview files to identify potential constraint minimization strategies that may be useful to said subject company.

11. The computer readable medium of claim 10, wherein said constraint-philosophy summary records stored in said repository serve as an intermediary that links the minimization strategies with relevant constraint-philosophy pairings defined by the mapping.

12. The computer readable medium of claim 10,
wherein said strategic information repository includes one unique constraint-philosophy summary record for each constraint-philosophy pairing, and
wherein each such summary record contains summary information regarding all of the potential constraint minimization strategies stored in the repository that may be used to improve innovation performance of a company meeting criteria of the constraint-philosophy pair in question.

13. The computer readable medium of claim 12, wherein said constraint-philosophy summary records provide active electronic links to one or more relevant ones of said constraint minimization strategy overview files.

14. The computer readable medium of claim 10, further comprising instructions to permit browsing of said constraint-philosophy summary records to diagnose potential constraints or potential philosophies affecting said subject company.

15. The computer readable medium of claim 10, wherein said constraints are organized by said mapping into categories of constraints selected from the following group: ideation constraints, selection constraints, development constraints, commercialization constraints, and cycle-wide constraints.

16. A computing system adapted to assisting a user in improving innovation strategies of a subject company by leveraging an archive of strategic innovation information, the computing system comprising:
    a memory;
    a processor;
    a persistent data store;
    a communications interface; and
    an electronic interconnection mechanism coupling the memory, the processor, the persistent data store, and the communications interface;
        wherein said persistent data store contains a database storing definitions of plurality of innovation constraints and innovation philosophies, and contains a strategic information repository comprising a collection of strategic information concerning innovation activities within one or more given industries, said strategic information being cross-referenced with a plurality of constraint minimization strategies and compiled into constraint minimization strategy overview files for each of said constraint minimization strategies; and
        wherein the memory is encoded with a constraint minimization strategy application that, when performed on the processor, causes the computing system to perform:
            linking said overview files in said strategic information repository with relevant pairings of said constraints and philosophies to produce a mapping of said strategic information repository, wherein said linking of said overview files is performed by said constraint minimization strategy application providing access to constraint-philosophy summary records stored in said strategic information repository,
                said strategic information repository containing one of said summary records for each pairing of said defined constraints and said defined philosophies, and
                said summary records each comprising documents that summarize and organize ones of said overview files that correspond to constraint minimization strategies that are relevant to a constraint-philosophy pairing in question;
            permitting navigation of said mapping to locate overview files in said strategic information repository corresponding to one or more identified constraints and one or more identified philosophies relevant to said subject company; and
            permitting review of a display of said located overview files to identify potential constraint minimization strategies that may be useful to said subject company.

17. The computer readable medium of claim 16, wherein said constraint-philosophy summary records provide active electronic links usable by said constraint minimization strategy application to access and display one or more relevant ones of said constraint minimization strategy overview files to said user.

* * * * *